United States Patent [19]
Nakatani

[11] 3,925,799
[45] Dec. 9, 1975

[54] SHUTTER CONTROL ARRANGEMENT FOR CAMERAS

[75] Inventor: Atsutada Nakatani, Tokyo, Japan

[73] Assignee: Copal Company Limited, Tokyo, Japan

[22] Filed: Mar. 27, 1974

[21] Appl. No.: 455,512

[30] Foreign Application Priority Data
Mar. 28, 1973 Japan.............................. 48-35191

[52] U.S. Cl. ................. 354/235; 354/250; 354/266
[51] Int. Cl.² ........................................... G03B 9/08
[58] Field of Search ........... 354/226, 234, 235, 241, 354/242, 245, 246, 250, 256, 258, 266, 34, 48, 50, 51

[56] References Cited
UNITED STATES PATENTS
3,777,646  12/1973  Shimiza.............................. 354/235

Primary Examiner—Joseph F. Peters, Jr.
Attorney, Agent, or Firm—Cushman, Darby & Cushman

[57] ABSTRACT

Shutter mechanism for cameras comprising a hold lever operated by shutter releasing, a mechanical delaying means for delaying the movement of the hold lever, and a rear blade release lever, which is moved by the hold lever and releases a rear blade actuating lever, only in case that the voltage of a power source cell decreases to or less than a pre-determined value and a magnet lever is not attracted for holding by an electro-magnet simultaneously with shutter releasing, thus said shutter mechanism being arranged so that exposure can be reliably carried out at a pre-determined shutter speed which is designed beforehand even in case that the voltage of the power source cell decreases to or less than a pre-determined value. Besides, said shutter mechanism is provided with an indicating lever which appears in the finder of the camera only when exposure is carried out at said pre-determined shutter speed which is designed beforehand.

6 Claims, 5 Drawing Figures

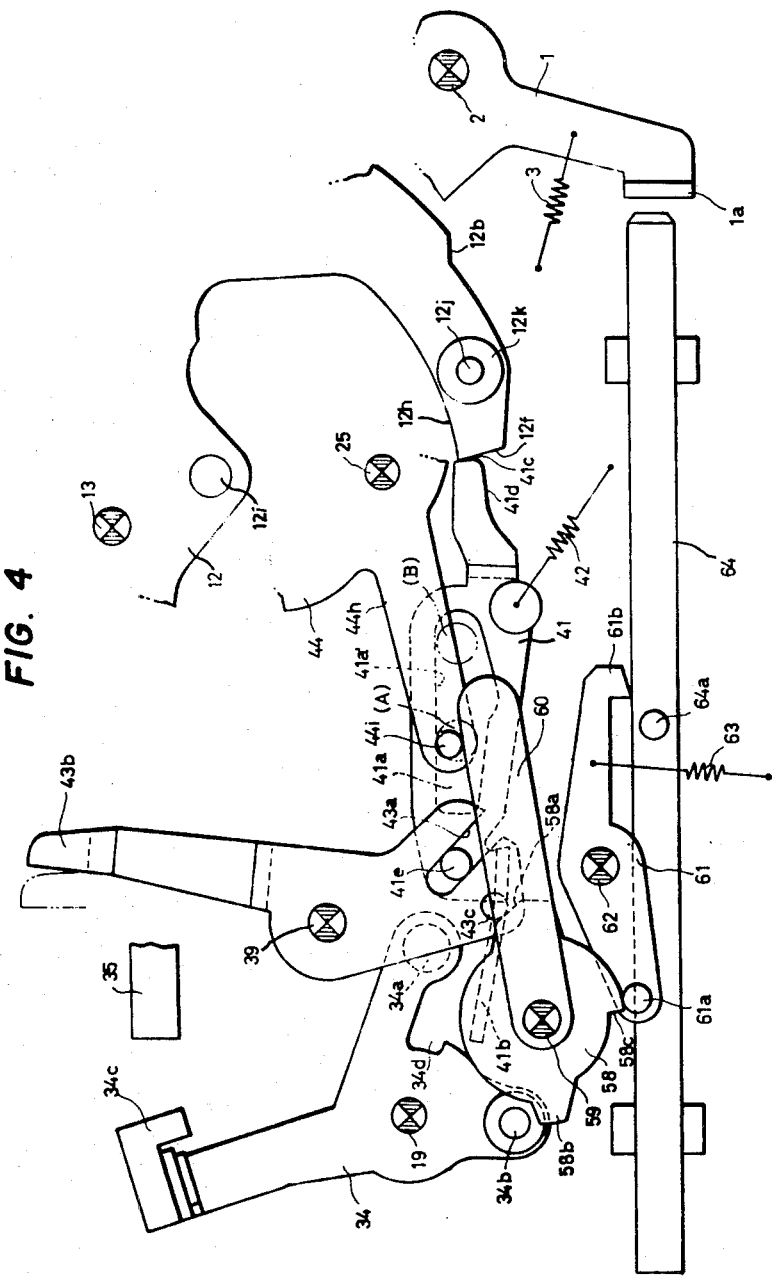

SHUTTER CONTROL ARRANGEMENT FOR CAMERAS

BACKGROUND OF THE INVENTION

1. Field of the invention

The present invention relates to shutter mechanism for cameras and, more particularly, an electronic shutter for cameras arranged so that exposure can be automatically carried out at a pre-determined shutter speed, which is designed beforehand, in case that the voltage of the power source cell deceases to or less than a pre-determined value.

2. Description of the prior art

As electronic shutters having an electric exposure time control means, various types are known. Those electronic shutters, however, generally have a disadvantage that the proper exposure time control function is lost when the voltage of the power source cell decreases to or less than a pre-determined value and it becomes impossible to take a photograph by a proper exposure according to the brightness of the object to be photographed.

SUMMARY OF THE INVENTION

It is, therfore, a primary object of the present invention to provide shutter mechanism for cameras arranged so that exposure will be automatically and reliably carried out, when the voltage of the power source cell decreases to or less than a pre-determined value, at a pre-determined shutter speed for which the shutter is designed beforehand.

Another object of the present invention is to provide shutter mechanism for cameras arranged to give a warning, when the voltage of the power source cell decreases to or less than a pre-determined value and exposure is carried out at a pre-determined shutter speed for which the shutter is designed beforehand, in order to let the user know to that effect.

Still another object of the present invention is to provide a shutter mechanism for cameras arranged so that a flash device for an X-class flash bulb becomes operable only when the voltage of the power source cell decreases to or less than a pre-determined value and exposure is carried out at a pre-determined shutter speed for which the shutter is designed beforehand.

The above-mentioned objects of the present invention can be attained by arranging as follows. That is, by providing a lock release member capable of temporarily locking the movement of a magnet lever member to remove from an electro-magnet simultaneously with shutter releasing when the attracting force of said electro-magnet decreases to or less than a pre-determined value, it is arranged so that said locking is released in relation to the movement of a release actuating member for shutter blades. Besides, by providing an indicating lever member operated by movement of said magnet lever member, it is arranged so that said indicating lever member appears in the finder of the camera or, in case of a single-lens reflex camera, that the mirror is held at its sprung-up position. Furthermore, by providing a lock release member rotated in the final stage of movement of the release actuating member for shutter blades, it is arranged so that the X-contact is closed by said release actuating member.

These and other objects as well as the attendant advantages of the present invention will become apparent by reading the following detailed description of embodiments of the invention when taken in conjunction with the accompanying drawings.

BRIEF DESCRIPTION OF THE DRAWINGS

FIG. 3 shows a partial view illustrating an embodiment of the mirror locking mechanism;

FIG. 4 shows a partial plan view illustrating an embodiment of the lock release mechanism and safety mechanism.

DESCRIPTION OF THE PREFERRED EMBODIMENTS

Figure 1:
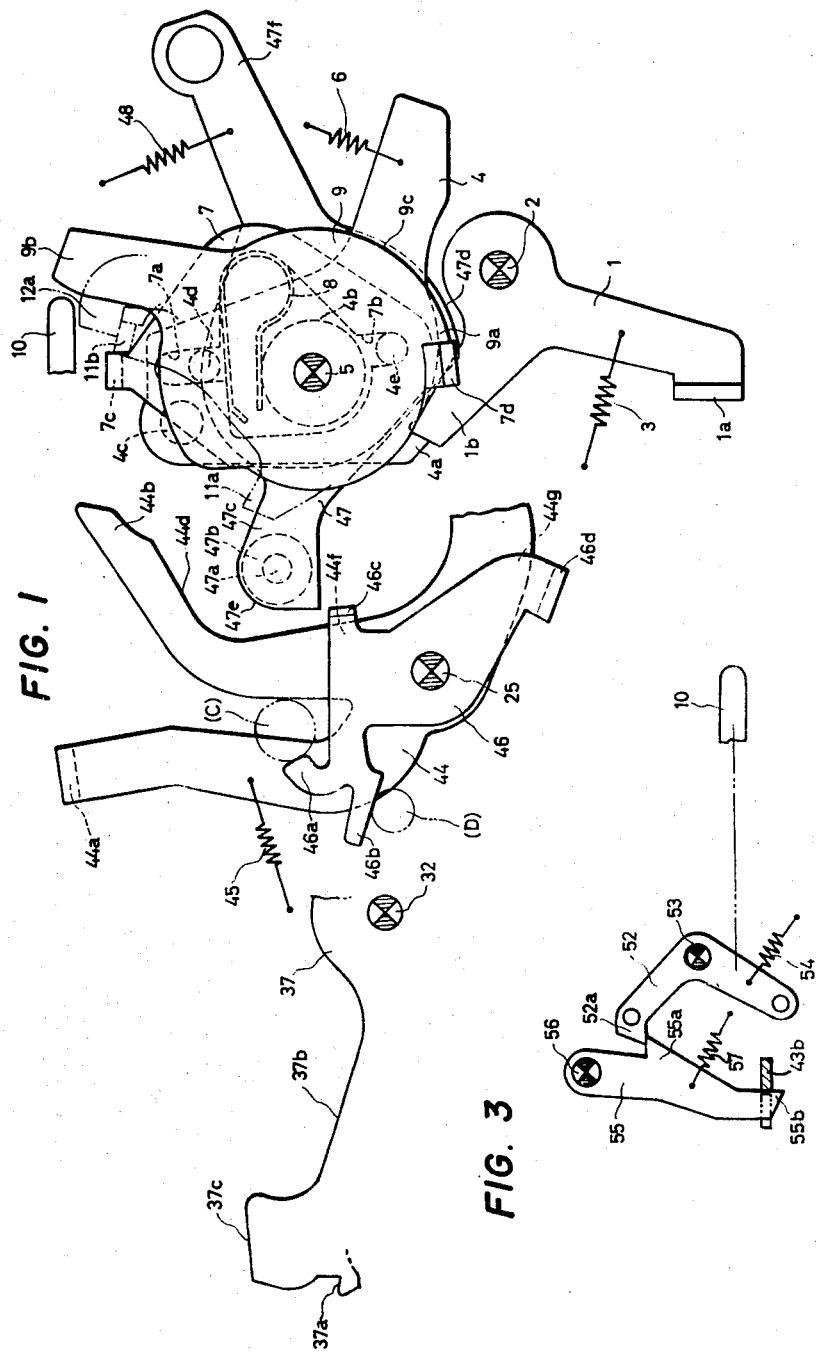
FIG. 1 shows a partial plan view of an embodiment of the present invention illustrating the mirror operating device and a part of the shutter release device.
Figure 2:
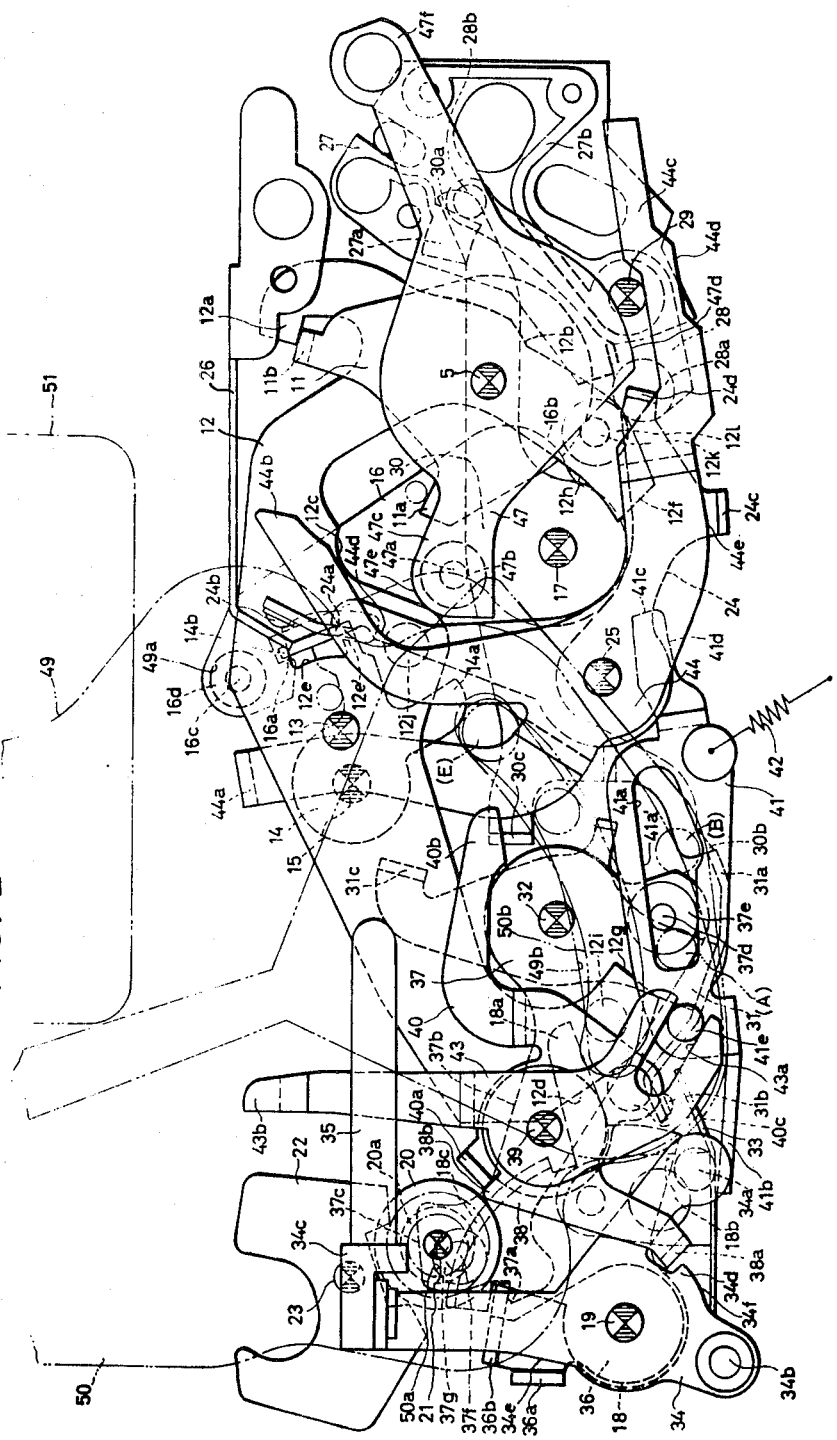
FIG. 2 shows a plan view of an important portion of an embodiment of the shutter mechanism according to the present invention.
Figure 5:
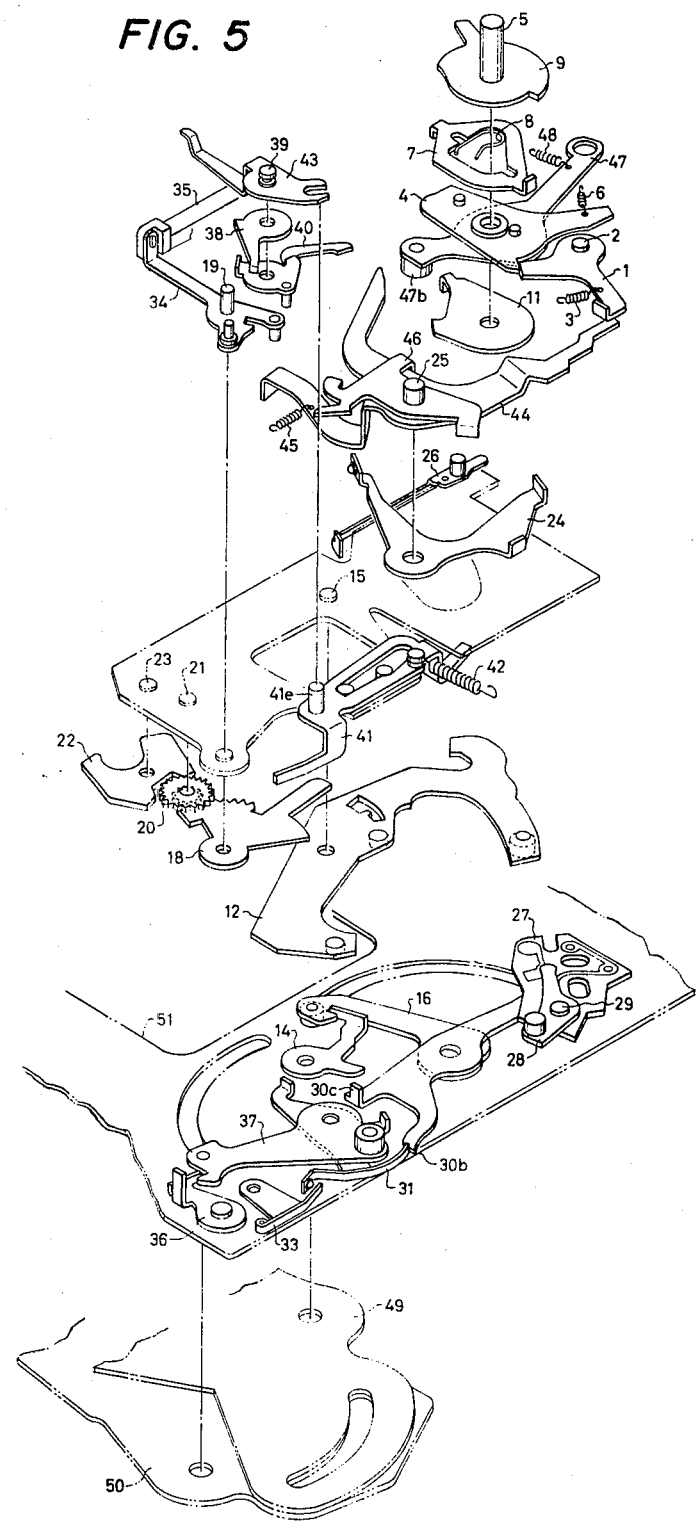
FIG. 5 is a perspective view of the embodiment shown in FIG. 2, showing the construction of essential components thereof.

Referring to FIGS. 1, 2 and 5, numeral 1 designates a release lever pivoted to a shaft 2 and biased clockwise by a spring 3. The release lever 1 has a bent portion 1a and an arm 1b. Numeral 4 designates an actuating plate pivoted to a shaft 5 and biased counterclockwise by a spring 6. The actuating plate 4 has a hook portion 4a engageable with the arm 1b, a columnar portion 4b and pins 4c, 4d and 4e. Numeral 7 designates a mirror returning plate having grooves 7a and 7b respectively engageable with said pins 4d and 4e and having bent portions 7c and 7d. The mirror returning plate 7 is biased by a spring 8, which is provided between the columnar portion 4b of the actuating plate 4 and a portion of the mirror returning plate 7, in the direction that the end portion of the groove 7b closely contacts the pin 4e. Numeral 9 designates a mirror actuating plate pivoted to the shaft 5 and having a hook portion 9a, which is engageable with the bent portion 7d, and an arm 9b and circumferential surface 9c. Numeral 10 designates an interlocking pin for the mirror arranged to be pushed leftward by the arm 9b. Normally, however, the interlocking pin 10 is urged rightward as described later. Numeral 11 designates a shutter release plate pivoted to the shaft 5 and biased clockwise by a spring which is not illustrated. The shutter release plate 11 has an arm 11a engageable with the pin 4c of the actuating plate 4 and a bent portion 11b. Numeral 12 designates a control lever pivoted to a shaft 13 and biased clockwise by a spring which is not illustrated. The control lever 12 has a hook portion 12a, which is engageable with the bent portion 11b, cam surfaces 12b and 12c, an outer circumferential surface 12d, a cut-off portion 12e which is provided with a locking surface 12e', end faces 12f and 12g, an inner circumferential surface 12h, pins 12i and 12j and a supporting shaft 12k which rotatably supports a roller 12l. Numeral 14 designates a front blade release lever pivoted to a shaft 15 and biased counterclockwise by a spring which is not illustrated. The front blade release lever 14 has an arm 14a engageable with the pin 12j and a bent portion 14b. Numeral 16 designates a front blade actuating lever pivoted to a shaft 17 and biased clockwise by a spring which is not illustrated. The front blade actuating lever 16 has a hook portion 16a which is engageable with the bent portion 14b, a cam surface 16b which is engageable with the roller 12l of the control lever 12, and a supporting shaft 16c which rotatably supports a roller 16d. Numeral 18 designates a hold lever pivoted to a shaft 19 and biased clockwise by a spring which is not illustrated. The hold lever 18 has an arm 18a which is engageable with the pin 12i of the control lever 12, another arm 18b and a sector gear portion 18c. Numeral 20 designates a star wheel rotatably mounted on a shaft 21. To the star wheel 20, a gear 20a meshing with the sector gear portion 18c is integrally mounted. Numeral 22 designates an anchor pivoted to a shaft 23 and meshed with the star wheel 20. The shape of the anchor 22 is selected so that said anchor 22 will act to keep the moving speed of the hold lever 18 at a constant speed when the hold lever moves counterclockwise and will not disturb the motion of the hold lever 18 when it moves clockwise. Numeral 24 designates an FP-contact lever i.e. a synchro-contact lever for igniting a F-class flash bulb pivoted to a shaft 25 and biased counterclockwise by a spring which is not illustrated. The FP-contact lever 24 has a bent portion 24a which is bent so that said bent portion 24a becomes engageable with the locking surface 12e' of the control lever 12, a contact 24b which is fixed at the end of the bent portion 24a, and bent portions 24c and 24d. Numeral 26 designates an FP-contact strip i.e. a synchro-contact strip for igniting a F-class flash bulb arranged so that it can contact the contact 24b. Numeral 27 designates a print board on which electrically conductive patterns 27a and 27b are formed. Numeral 28 designates a switch lever pivoted by a shaft 29 on the print board 27 in the condition that the switch lever 28 is in contact with the electrically conductive pattern 27b and biased clockwise by a spring which is not illustrated. The switch lever 28 has a pin 28a which engages with the cam surface 12b of the control lever 12 and a contact 28b capable of contacting the electrically conductive pattern 27a. Numeral 30 designates an X-contact control lever pivoted to the shaft 17 and biased counterclockwise by a spring which is not illustrated. The X-contact control lever 30 has an arm 30a which is engageable with the roller 16d of the front blade actuating lever 16, another arm 30b and a stepped bent portion 30c. Numeral 31 designates an X-contact lever pivoted to a shaft 32 and biased clockwise by a spring which is not illustrated. The X-contact lever 31 has an arm 31a, which is engageable with the arm 30b, a contact 31b and a bent portion 31c. Numeral 33 designates an X-contact strip arranged so that it can contact with the contact 31b. Numeral 34 designates a magnet lever pivoted to the shaft 19 and having a pin 34a which engages with the arm 18b of the hold lever 18, another pin 34b, a pole contacting member 34c, a hook portion 34d, an arm 34e and a cam surface 34f. The magnet lever 34 is arranged to be urged counterclockwise when a spring which is applied between the magnet lever 34 and the lever 18 but is not illustrated is charged by counterclockwise turning of the lever 18. Numeral 35 designates a core of an electro-magnet opposed to said pole contacting member 34c. Numeral 36 designates a rear blade release lever pivoted to said shaft 19 and biased clockwise by a spring which is not illustrated. The rear blade release lever has a bent portion 36a which is engageable with the arm 34e and another bent portion 36b. Numeral 37 designates a rear blade actuating lever pivoted to the shaft 32 and biased clockwise by a spring which is not illustrated. The rear blade actuating lever 37 has a hook portion 37a which engages with the bent portion 36b, an arm 37b engageable with the bent portion 31c of the X-contact lever 31, an end face 37c, a supporting shaft 37d which rotatably supports a roller 37e and a supporting shaft 37f which rotatably supports a roller 37g. The roller 37e is arranged so that it can engage with the end face 12g of the control lever 12. Numeral 38 designates a lock lever pivoted to a shaft 39 and biased clockwise by a spring which is not illustrated. The lock lever 38 has a bent portion 38a, which is capable of stopping the counterclockwise rotation of the magnet lever 34 by engaging with the hook portion 34d of the magnet lever 34, and a shoulder portion 38b. Numeral 40 designates a release lever pivoted to the shaft 39 and biased counterclockwise by a spring, which is not illustrated and is stronger than the spring for the lever 38. The release lever 40 has a bent portion 40a which engages with the shoulder portion 38b, an arm 40b which engages with the bent portion 30c of the X-contact control lever 30, and a pin 40c which engages with the outer circumferential surface 12d of the control lever 12. Numeral 41 designates an indication control lever having a cut-off portion 41a, a bent portion 41b which is engageable with the pin 34a of the magnet lever 34, an end face 41c which is arranged so that it can be positioned in the path of the end face 12f of the control lever 12, a side surface 41d which is engageable with the inner circumferential surface 12h of the control lever 12 and a pin 41e. The indication control lever 41 is fitted to pins (A) and (B), which are fixed on a base plate which is not illustrated, by means of the cut-off portion 41a and is biased by a spring 42 to turn clockwise and to move rightward. Numeral 43 designates an indicating lever pivoted to the shaft 39 and having a forked portion 43a, which fits to the pin 41e, and an indicating arm 43b. Numeral 44 designates a mirror returning lever pivoted to the shaft 25 and biased counterclockwise by a spring 45. The mirror returning lever 44 has a bent portion 44a which is engageable with the end face 37c of the rear blade actuating lever 37, an arm 44b which is engageable with the bent portion 7c of the mirror returning plate 7, another arm 44c, a cam surface 44d and an outer circumferential surface 44e which is engageable with the bent portion 24c of the FP-contact lever 24. Numeral 46 designates a brake plate pivoted to the shaft 25 and having arms 46a and 46b, and arcuate bent portions 46c and 46d respectively engageable with portions 44f and 44g of the mirror returning lever 44. The brake plate 46 is held in its fixed condition by engaging with pins (C) and (D), which are fixed on the base plate, and the arms 46a and 46b. Numeral 47 designates a set lever pivoted to the shaft 5 and biased counterclockwise by a spring 48. The set lever 47 has a supporting shaft 47a which supports a roller 47b engageable with the cam surface 12c of the control lever 12, an arm 47c engageable with the pin 4c of the actuating plate 4, a cam surface 47d engageable with the bent portion 24d of the FP-contact lever 24, a cam surface 47e engageable with the cam surface 44d of the mirror returning lever 44, and an operating arm 47f. Reference symbol (E) designates a pin fixed on the base plate which is not illustrated and serving as a fulcrum in common to both of front and rear blades which are to be described later. Numeral 49 designates one of front blades which constitute a set of five blades. The front blade 49 has a round hole 49a fitted to the roller 16d of the front blade actuating lever 16 and a slot 49b fitted to the pin (E). Remaining four front blades respectively have round holes fitted to the pin (E) and slots fitted to the roller 16d. Numeral 50 designates one of rear blades which constitute a set of five blades. The rear blade 50 has a round hole 50a fitted to the roller 37g of the rear blade actuating lever 37 and a slot 50b fitted to the pin (E). Remaining four rear blades respectively have round holes fitted to the pin (E) and slots fitted to the roller 37g. Numeral 51 designates an exposure aperture. In the shutter cocked state, rear blades 50 are kept in condition like a fan folded and do not cover the exposure aperture 51 but front blades 49 are kept in condition like a fan unfolded and cover the exposure aperture 51. When the shutter is released, front blades are first folded to open the exposure aperture 51 and, after a pre-controlled time passes, rear blades are brought to condition like a fan unfolded and cover the exposure aperture 51, thus one exposure operation is completed. As arrangement of such blades are known for example by U.S. Pat. No. 3,628,438, its detailed description is omitted here.

Now, operation of the above-mentioned mechanism is described below at first for the case when the voltage of the power source cell is at a level higher than a pre-determined value.

FIGS. 1, 2 and 5 show the shutter in cocked state. When the release lever 1 is turned counterclockwise against the spring 3 by pushing the bent portion 1a from the state shown in FIG. 1, the arm 1b is disengaged from the hook portion 4a and the actuating plate 4 is turned counterclockwise by the force of the spring 6. Because of this counterclockwise rotation, the mirror returning plate 7 is first turned counterclockwise and, at the same time, the mirror actuating plate 9 is also turned counterclockwise. Consequently, by the arm 9b, the mirror actuating pin 10 is pushed leftward against its bias and makes the mirror spring up.

Besides, the actuating plate 4 pushes, on the final stage of its counterclockwise rotation, the arm 11a by the pin 4c and turns the shutter release plate 11 counterclockwise against its bias. Therefore, the bent portion 11b is disengaged from the hook portion 12a and the control lever 12 turns clockwise because of its bias. By clockwise rotation of the control lever 12, the pin 12i pushes the arm 18a at first, thus the hold lever 18 is turned counterclockwise at a predetermined speed against its bias. At that time, the magnet lever 34 tends to turn counterclockwise because the unillustrated spring, which is applied between the magnet lever 34 and hold lever 18, is charged. However, before the actuating plate 4 turns the shutter release plate 11, the power switch of the exposure time control circuit not shown is closed and the electro-magnet is energized. Therefore, the magnet lever 34 is attracted by the core 35 of the electromagnet and is held in the illustrated position and a slight gap is caused between the hook portion 34d and bent portion 38a of the lock lever 38. Then, the locking surface 12e is disengaged from the bent portion 24a and, consequently, the FP-contact lever 24 turns counterclockwise because of its bias, the contact 24b contacts the FP-contact strip 26 and, when the flash device of FP-class is set in operable condition, its ignited bulb is flashed. As the outer circumferential surface 12d is then disengaged from the pin 40c, the release lever 40 turns counterclockwise because of its bias and, at the same time, turns the lock lever 38 counterclockwise against its bias because of the relation between the bent portion 40a and shoulder portion 38b. Therefore, the arm 40b moves apart from the bent portion 30c of the X-contact control lever 30 and makes the bent portion 38a retract from the path of the hook portion 34d of the magnet lever 34. Then, the cam surface 12b pushes the pin 28a and turns the switch lever 28 counterclockwise against its bias. Thus, the contact 28b contacts the electrically conductive pattern 27a of the print board 27 and control operation of the exposure time control circuit is started in order to decide the adequate exposure time. At the same time, the pin 12j pushes the arm 14a to turn the front blade release lever 14 clockwise against its bias and to disengage the bent portion 14b from the hook 16a. Consequently, the front blade actuating lever 16 turns clockwise because of its bias and opens front blades 49 by the roller 16d. On the other hand, the actuating lever 16 pushes at the final stage of its clockwise turn, the arm 30a by the roller 16d to turn the X-contact control lever 30 clockwise against its bias and to disengage the arm 30b from the arm 31a. Consequently, the X-contact lever 31 turns counterclockwise because of its bias, the contact 31b contacts the X-contact strip 33 and, when the flash device of X-class is set in operable condition, its flash bulb is ignited.

When the electro-magnet is de-energized by the exposure time control circuit after a pre-determined time, the magnet lever 34 turns counterclockwise from the illustrated position because of the force of the unillustrated spring, which is applied between the magnet lever 34 and hold lever 18, and pushes the bent portion 36a by the arm 34e to turn the rear blase release lever 36 counterclockwise against its bias and, as a result, to disengage the bent portion 36b from the hook portion 37a. Consequently, the rear blade actuating lever 37 turns clockwise because of its bias and moves rear blades 50 to their closed position by the roller 37g. Besides, by clockwise turn of the actuating lever 37, at first the arm 37b pushes the bent portion 31c to turn the X-contact lever 31 clockwise against its bias and disengages the contact 31b from the X-contact strip 33. Besides, the end face 37c pushes the bent portion 44a and turns the mirror returning lever 44 clockwise against its bias. By clockwise turn of the mirror returning lever 44, the outer circumferential surface 44e pushes the bent portion 24c to turn the FP-contact lever 24 clockwise against its bias and disengages the contact 24b from the FP-contact strip 26. Besides, the arm 44c opens the power switch which is not illustrated and releases the double-winding preventing means for the film.

Besides, the arm 44b pushes the bent portion 7c, which is in its path, to move the mirror returning plate 7 against the spring 8 toward the direction that the end portion of the groove 7a will closely contact the pin 4d and to disengage the bent portion 7d from the hook portion 9a of the mirror actuating plate 9. Consequently, the mirror actuating pin 10 returns to the illustrated position because of its bias by pushing the arm 9b and by turning the actuating plate 9 clockwise and returns the unillustrated mirror to its normal position (a position to be reflected light from an object to be photographed). Besides the mirror returning lever 44 is braked from a position on the way in its clockwise turn as portions 44f and 44g respectively contact arcuate bent portions 46c and 46d causing friction.

Besides, as the pin 34a is displaced because of counterclockwise turn of said magnet lever 34, the indication control lever 41 tends to turn clockwise by the force of the spring 42. At that time, however, the inner circumferential surface 12b of the control lever 12 is in the path of the side surface 41d and, therefore, the indicating control lever 41 does not turn clockwise practically.

Now, cocking operation of the shutter is described below.

When the set lever 47 is turned clockwise by the arm 47f, the actuating plate 4 is turned clockwise because the pin 4c is pushed by the arm 47c, the control lever 12 is turned counterclockwise because the cam surface 12c is pushed by the roller 47b, the FP-contact lever 24 is brought to the condition that it cannot turn counterclockwise because its bent portion 24d is locked by the cam surface 47d, and the mirror returning lever 44 is brought to the condition that it can turn counterclockwise because the cam surface 44d is pushed by the cam surface 47e and is released from frictional contact of the brake plate 46.

The actuating plate 4 is returned to the illustrated position as it is turned clockwise until the hook portion 4a engages with the arm 1b of the release lever 1. The mirror returning plate 7 is also returned to the illustrated position as the mirror returning plate 7 turns clockwise integrally with the actuating plate 4 according to clockwise rotation of the actuating plate 4 as the bent portion 7d slides on the circumferential surface 9c of the mirror actuating plate 9 and, when the bent portion 7d comes to the position where it opposes to the hook portion 9a, the end portion of the groove 7b is moved by the spring 8 toward the direction that the end portion closely contacts the in 4e.

As the pin 4c is displaced by clockwise turn of the actuating plate 4, the shutter release plate 11 returns to the illustrated postion by turning clockwise following the actuating plate 4 because of the bias of the shutter release plate 11. Therefore, the control lever 12 also turns clockwise, the hook portion 12a engages with the bent portion 11b of the release plate 11, thus the control lever 12 returns to the illustrated position. By counterclockwise turn of the control lever 12, the following motion is performed. That is, the roller 12l pushes the cam surface 16b and turns the front blade actuating lever 16 counterclockwise against its bias, the front blade release lever 14 follows the movement of the pin 12j and its bent portion 14b engages with the hook portion 16a as illustrated and, as a result, front blades 49 cover the exposure aperture 51. At the same time as the front blades actuating lever 16 returns to the illustrated position, the X-contact control lever 30 turns counterclockwise because of its bias, and the arm 30b engages with the arm 31a of the X-contact lever 31. Besides, as the cam surface 12b moves, the switch lever 28 turns clockwise because of its bias and the contact 28b is released from the electrically conductive pattern 27a. Besides, as the pin 40c is pushed by the outer circumferential surface 12d, the release lever 40 is turned clockwise to the illustrated position against its bias. At that time, the lock lever 38 is turned clockwise by following the release lever 40 and is returned to the illustrated position. As clockwise motion of the lock lever 38 is carried out prior to returning of the magnet lever 34 to the illustrated position which is described below, the lock lever 38 returns to the illustrated position after its bent portion 38a is once locked by the cam surface 34f. Besides, as the pin 12i moves, the hold lever 18 turns clockwise because of its bias and turns the magnet lever 34 clockwise until its pole-contacting member 34c contacts the core 35 by pushing the pin 34a by the arm 18b. By returning of said lever 34, the pin 34a returns to the condition to lock the arm 41b.

Therefore, even when the inner circumferential surface 12h of the control lever 12 retracts from the path of the side surface 41d, the indication control lever 41 is still kept in the illustrated condition. Besides, as the end face 12g pushes the roller 37e, the rear blade actuating lever 37 is turned counterclockwise against its bias and the hook portion 37a is engaged with the bent portion 36b of the rear blade release lever 36 which turns clockwise following the clockwise movement of the magnet lever 34, thus the rear blade actuating lever 37 is held in the illustrated condition.

The mirror returning lever 44 becomes rotatable in counterclockwise direction because of retracting of the end face 37c of the rear blade actuating lever 37. However, in the initial stage, the lever 44 cannot be turned counterclockwise because portions 44f and 44g are pushed against arcuate bent portions 46c and 46d of the control lever 46. Then, however, the mirror returning lever 44 is forcedly turned counterclockwise by said set lever 47 and is released from the arcuate bent portions. After that, the mirror returning lever 44 is returned to the illustrated position by its bias.

Though the FP-contact lever 24 becomes rotatable in counterclockwise direction because of the counterclockwise movement of the mirror returning lever 44, it cannot be turned counterclockwise because the bent portion 24d is locked by the cam surface 47d of the set lever 47 as described in the above. Besides, the locking surface 12e' becomes opposite to the bent portion 24a by counterclockwise turn of the control lever 12. Therefore, the FP-contact lever 24 is held in the illustrated position even when the set lever 47 is released by completion of the cocking operation and the set lever 47 returns to the illustrated position because of its bias and locking of the bent portion 24d by the cam surface 47d is released, thus the FP-contact lever 24 does not contact the FP-contact strip 26.

By the above, shutter cocking operation is completed.

Now, the operation of the above-mentioned mechanism is described for the case when the voltage of the power source cell becomes lower than the pre-determined value because the power source cell is consumed and the magnet lever 34 cannot be attracted by the core 35 even when the electromagnet is energized.

In this case, the magnet lever 34 is not held in its attracted condition by the core 35 when the hold lever 18 is turned counterclockwise in the above-mentioned shutter release operation. Therefore, the magnet lever 34 is turned counterclockwise by the force of the unillustrated spring, which is applied between the magnet lever 34 and hold lever 18, following the counterclockwise rotation of the hold lever 18 and the hook portion 34d contacts the bent portion 38a of the lock lever 38. At that time, the arm 34e does not reach the position to push the bent portion 36a of the rear blade release lever 36.

Besides, following the movement of the pin 34a caused by counterclockwise turn of the magnet lever 34, the indication control lever 41 is turned clockwise by the spring 42 and the end face 41c enters the path of movement of the end face 12f of the control lever 12. Therefore, the end face 41c is pushed by the end face 12f when the control lever 12 turns clockwise and the indication control lever 41 is moved leftward against the spring 42. At that time, movement of the indication control lever 41 is guided such that the upper surface 41a' of the cut-off portion 41a slides on pins (A) and (B). Consequently, the indication lever 43 is turned clockwise because the pin 41e and forked portion 43a are fitted to each other, the arm 43b moves to a position at which it can be seen through, for example, a finder not whon and indicates that the voltage of the power source cell is lower than the pre-determined value and that the exposure is performed at a specific shutter speed which is decided when the shutter is designed.

On the other hand, the release lever 40 tends to turn counterclockwise together with the lock lever 38 as the outer circumferential surface 12d of the control lever 12 moves. At that time, however, the bent portion 38a of the lock lever 38 engages with the hook portion 34d of the magnet lever 34 and, therefore, the release lever 40 cannot be turned counterclockwise. When the X-contact control lever 30 turns clockwise after the above, the arm 40b is pushed by the bent portion 30c and the release lever 40 is turned counterclockwise and, as a result, the bent portion 38a of the lock lever 38 is disengaged from the hook portion 34d. Therefore, the magnet lever 34 becomes rotatable in counterclockwise direction. After that, each mechanical element is operated in the same order as described before and exposure is ended.

When the magnet lever 34 is returned to the illustrated position by the above-mentioned cocking operation, the bent portion 41b is pushed by the pin 34a and, consequently, the indication control lever 41 and indicating lever 43 are returned to illustrated positions, respectively.

In the above embodiment, it is so arranged that the arm can be seen through the finder in order to indicate that the voltage of the power source cell is lower than the pre-determined value and exposure is to be carried out at a specific shutter speed which is decided beforehand. This indication can be also carried out by keeping the mirror in the sprung-up condition even after the exposing operation of the shutter is completed. Such embodiment is described below referring to FIG. 3.

In FIG. 3, numeral 52 designates a mirror operating lever pivoted to a shaft 53 and biased counterclockwise by a spring 54. The mirror operating lever 52 has a pawl portion 52a and is arranged to move together with the mirror actuating pin 10. That is, when the pin 10 is moved leftward by the arm 9b of the mirror actuating plate 9, the mirror operating lever 52 is turned clockwise against the spring 54 to spring up the mirror not shown. When the actuating plate 9 becomes free, the mirror operating lever 52 turns counterclockwise in order to return the pin 10 rightward by the spring 54 and to return the mirror to the normal position. Numeral 55 designates a mirror locking lever pivoted to a shaft 56 and biased counterclockwise by a spring 57. The mirror locking lever 55 has a hook portion 55a which is engageable with the pawl portion 52a and an arm portion 55b which is to be pushed by the arm 43b of the indicating lever 43.

FIG. 3 shows the condition after the exposure operation is completed in case that exposure was carried out at a pre-determined specific shutter speed. In this case, the arm 43b of the indicating lever 43 is moved to the position shown by a solid line as described in the above. Therefore, the mirror locking lever 55 is turned counterclockwise by the spring 57 and is in the illustrated position. Consequently, the mirror operating lever 52, which is turned counterclockwise against the spring 54 by the spring-up motion of the miror, is kept in the illustrated position because the pawl portion 52a is locked by the hook portion 55a. As a result, the pin 10 is kept at the position moved leftward even when the mirror actuating plate 9 becomes free and the arm 9b which is released from the pin 10 after completion of closing operation of blades, and therefore, the mirror not shown is kept at the sprung-up position in order to warn the operator that exposure was carried out at a pre-determined shutter speed.

The mirror is returned to the normal position when the arm 43b of the indicating lever 43 is returned to the position shown by a two-dot chain lie in FIG. 3 by cocking operation of the shutter. That is, when the arm 43b of the indicating lever 43 is returned to the position shown by the two-dot chain line, the mirror locking lever 55 is turned clockwise against the spring 57 and the hook portion 55a is disengaged from the pawl portion 52a. Therefore, the mirror operating lever 52 is turned counterclockwise by the spring 54 and the pin 10 is moved rightward.

It is required to arrange so that the above-mentioned retracting of the arm 43b of the indicating lever 43 from the finder system of returning of the mirror to the normal position can be attained independent of cocking operation. As described in the above, the mirror returning lever 44 is turned clockwise when the bent portion 44a is pushed by the end face 37c of the rear blade actuating lever 37, the mirror returning lever 44 is braked on the way of its clockwise rotation and at the same time, the bent portion 7d is released from the hook portion 9a by pushing the bent portion 7c of the mirror returning plate 7 by the arm 44b simultaneously with the clockwise rotation in order to bring the mirror actuating plate 9 to free condition and to return the mirror to the normal position. Besides, the arm 44c is used to release the power switch not shown and to release the double-winding preventing means for the film. Furthermore, the outer circumferential surface 44e is used to turn the FP-contact lever 24 clockwise through the bent portion 24c and to release the FP-contact lever 24 from the FP-contact strip 26. Therefore, because of the relation between the impact force applied to the mirror returning lever 44 by the rear blade actuating lever 37 and load applied at the time of clockwise rotation of the returning lever 44, the above-mentioned operation performed by the clockwise rotation of the returning lever 44 cannot be sometimes carried out perfectly if, for example, blades are locked during movement by any chance for some reason. Under such condition, the double-winding preventing means cannot be released and next winding cannot be carried out. Therefore, it is desirable that the shutter is arranged to eliminate such inconveniences.

Another embodiment which satisfies the above-mentioned requirement is described below referring to FIG. 4.

Numeral 43 designates an indicating lever similar to that shown in FIG. 2 but different from the indicating lever shown in FIG. 2 by the fact that a pin 43c is additionally provided. Numeral 44 designates a mirror returning lever similar to that shown in FIG. 2 but is different from the mirror returning lever in FIG. 2 by the fact that the arm 44h and the pin 44i are additionally provided. Numeral 58 designates a cam plate pivoted to a shaft 59 and rotated by a speed adjusting dial not shown. The cam plate 58 has a cam portion 58a engageable with the pin 43c of the indicating lever 43, a cam portion 58b engageable with the pin 34b of the magnet lever 34 and a stepped portion 58c. Numeral 60 designates a returning arm integrally mounted to the cam plate 58 and engaged with the pin 44i of the mirror returning lever 44. Numeral 61 designates a release lock lever pivoted to a shaft 62 and biased clockwise by a spring 63. The release lock lever 61 has a pin 61a which is capable of opposing the stepped portion 58c of the cam plate 58 and a hook portion 61b. Numeral 64 designates a release button having a pin 64a, which is engageable with the hook portion 61b, and arranged so as to be engageable with the bent portion 1a of the release lever 1.

FIG. 4 shows the condition when exposure operation is completed in case that exposure was carried out at a pre-determined specific shutter speed. When the cam plate 58 is turned counterclockwise from the above condition to turn the indicating lever 43 counterclockwise by pushing the pin 43c by the cam portion 58a, the arm 43b returns to the position shown by a two-dot chain line. Consequently, the mirror locking lever 55 is turned clockwise against the spring 57 and the mirror is returned to the normal position as described before.

Even if the mirror returning lever 44 is not turned clockwise by a required angle due to some cause, the returning arm 60 turns the returning lever 44 by pushing the pin 44i when the cam plate 58 is turned counterclockwise. Therefore, required operations can be carried out perfectly.

The condition that the cam plate 58 is kept at the position turned counterclockwise as above is an abnormal condition under which the indicating lever 43 cannot be turned clockwise and the mirror returning lever 44 cannot be turned clockwise. Therefore, in that case, the pin 61a is opposed to the stepped portion 58c, the release lock lever 61 is turned clockwise by the spring 63, the hook portion 61b is in the path of the pin 64a, thus it becomes impossible to operate the release button 64.

Besides, it is possible to keep the magnet lever 34 at the position pushed against the core 35 by turning the cam plate 58 clockwise and pushing the pin 34b by the cam portion 58b. This is the condition that the shutter is set for bulb photographing.

In the above-mentioned embodiments, the mechanism is arranged so as to start the operation of the exposure time control circuit or to start the operation of the reproducing circuit when the electrically conductive pattern 27a of the print board 27 contacts the contact 28b of the switch lever. However, it is also possible to arrange so that the operation is started when the contact is changed over from contacting cndition to non-contacting condition.

I claim:

1. A shutter mechanism for cameras comprising: a control lever arranged to be released from its locked condition by shutter release operation, a front blade release lever engageable with said control lever and rotated by movement of said control lever, a front blade actuating lever engageable with said front blade release lever and released by movement of said front blade release lever to move front blades, a hold lever engageable with said control lever and rotated by movement of said control lever, a magnet lever engageable with said hold lever and rotatable by following rotation of said hold lever, a rear blade release lever engageable with said magnet lever and rotated by said magnet lever at the final stage of movement of said magnet lever, a rear blade actuating lever engageable with said rear blade release lever and released by rotation of said rear blade release lever to move rear blades, a lock lever engageable with said magnet lever and capable of locking said magnet lever, an indication control lever engaging with said magnet lever and engageable with said control lever, and an indicating lever connected to said indication control lever, engagement of said magnet lever and lock lever being released by said front blade actuating lever at the final stage of movement of said front blade actuating lever, and said indicating lever being moved by said control lever through said indication control lever when said magnet lever is locked by said lock lever.

2. A shutter mechanism for cameras comprising: a control lever arranged to be released from its locked condition by shutter release operation, a front blade release lever engageable with said control lever and rotated by movement of said control lever, a front blade actuating lever engageable with said front blade release lever and released by movement of said front blade release lever to move front blades, a hold lever engageable with said control lever and rotated by movement of said control lever, a magnet lever engageable with said hold lever and rotatable by following rotation of said hold lever, a rear blade release lever engageable with said magnet lever and rotated by said magnet lever at the final stage of movement of said magnet lever, a rear blade actuating lever engageable with said rear blade release lever and released by rotation of said rear blade release lever to move rear blades, a lock lever engageable with said magnet lever and capable of locking said magnet lever, a lock release lever engaged with said lock lever, an X-contact control lever engaged with said lock release lever and engageable with said front blade actuating lever, an X-contact lever engageable with said X-contact control lever, and an X-contact strip contactable with said X-contact lever, engagement of said magnet lever and lock lever being released by said front blade actuating lever at the final stage of movement of said front blade actuating lever, and said X-contact lever being brought into contact with said X-contact strip when said X-contact control lever is rotated by said front blade actuating lever.

3. A shutter mechanism for cameras comprising: a control lever arranged to be released from its locked condition by shutter release operation, a front blade release lever engageable with said control lever and rotated by movement of said control lever, a front blade actuating lever engageable with said front blade release lever and released by movement of said front release lever to move front blades, a hold lever engageable with said control lever and rotated by movement of said control lever, a magnet lever engageable with said hold lever and rotatable by following rotation of said hold lever, a rear blade release lever engageable with said magnet lever and rotated by said magnet lever at the final stage of movement of said magnet lever, a rear blade actuating lever engageable with said rear blade release lever and released by rotation of said rear blade release lever to move rear blades, a lock lever engageable with said magnet lever and capable of locking said magnet lever, a shutter release plate engageable with said control lever and capable of locking said control lever in its cocked position, an actuating plate engageable with said shutter release plate, a mirror returning plate connected to said actuating plate, a mirror actuating plate engaged with said mirror returning plate, and a mirror actuating pin engageable with said mirror actuating plate, engagement of said magnet lever and lock lever being released by said front blade actuating lever at the final stage of movement of said front blade actuating lever, and said mirror actuating pin being pushed by said mirror actuating plate by shutter release operation and a reflecting mirror being sprung up thereby.

4. A shutter mechanism for cameras according to claim 3, in which said shutter mechanism further comprises a mirror operating lever connected to said mirror actuating pin, a mirror locking lever engageable with said mirror operating lever, and an indicating lever engaged with said mirror locking lever, said mirror operating lever being locked by said mirror locking lever when said indicating lever is moved and said reflecting mirror thereby being held in its sprung up position.

5. A shutter mechanism according to claim 4, in which said shutter mechanism further comprises a cam plate engaged with said indicating lever, and a mirror returning lever engaged with said cam plate and engageable with said mirror returning plate, said indicating lever being moved to its non-indicating position when said cam plate is rotated and, at the same time, said reflecting mirror being returned to its normal position.

6. A shutter mechanism according to claim 5, in which said shutter mechanism further comprises a release lock lever engaged with said cam plate, and a release button engageable with said release lock lever, said release button being locked by said release lock lever when said cam plate is rotated.

* * * * *